United States Patent
Ganguli et al.

(10) Patent No.: US 10,936,886 B2
(45) Date of Patent: Mar. 2, 2021

(54) METHOD AND SYSTEM FOR STEREO BASED VEHICLE POSE ESTIMATION

(71) Applicant: PLUSAI CORP, Cupertino, CA (US)

(72) Inventors: Anurag Ganguli, Milpitas, CA (US); Timothy Patrick Daly, Jr., San Jose, CA (US); David Wanqian Liu, Los Altos, CA (US); Hao Zheng, Saratoga, CA (US)

(73) Assignee: PLUSAI CORP, Cupertino, CA (US)

( * ) Notice: Subject to any disclaimer, the term of this patent is extended or adjusted under 35 U.S.C. 154(b) by 121 days.

(21) Appl. No.: 16/224,317

(22) Filed: Dec. 18, 2018

(65) Prior Publication Data
US 2019/0205670 A1   Jul. 4, 2019

Related U.S. Application Data

(60) Provisional application No. 62/612,195, filed on Dec. 29, 2017.

(51) Int. Cl.
  *G06K 9/00* (2006.01)
  *H04N 5/247* (2006.01)
  *H04N 13/204* (2018.01)
  *G05D 1/02* (2020.01)

(52) U.S. Cl.
  CPC .......... *G06K 9/00805* (2013.01); *H04N 5/247* (2013.01); *H04N 13/204* (2018.05); *G05D 1/0251* (2013.01); *G06K 2209/23* (2013.01)

(58) Field of Classification Search
  CPC .. G06K 9/00; G06K 9/00664; G06K 9/00671; G06K 9/00288; G06K 9/00208; G06K 9/00201; G06K 9/00268; G06K 9/00355; G06K 9/00805; G06K 2209/23; H04N 5/23219; H04N 13/239;
  (Continued)

(56) References Cited

U.S. PATENT DOCUMENTS

| 8,965,044 | B1 | 2/2015 | Owechko et al. |
| 9,946,264 | B2 * | 4/2018 | Liao ................ G05D 1/0253 |
| 2005/0265583 | A1 | 12/2005 | Covell et al. |

(Continued)

FOREIGN PATENT DOCUMENTS

WO   2017197630 A1   11/2007

OTHER PUBLICATIONS

International Search Report and Written Opinion dated Feb. 25, 2019 in International Application PCT/US2018/066277.
(Continued)

*Primary Examiner* — Diane D Mizrahi
(74) *Attorney, Agent, or Firm* — Pillsbury Winthrop Shaw Pittman LLP

(57) ABSTRACT

The present teaching relates to method, system, medium, and implementation of estimating a pose of an object in autonomous driving. Stereo images are obtained from a scene via at least two cameras. Objects present in the scene are then detected from the stereo images. For each object detected, a plurality of feature points are identified and depth information associated with the feature points are obtained. An orientation of each object is then estimated based on the feature points and depth information of the object and the pose of the object is then estimated based on the orientation and additional features of the object.

27 Claims, 16 Drawing Sheets

(58) Field of Classification Search
CPC .. H04N 13/128; H04N 13/194; H04N 13/204; H04N 5/247; H04N 13/344; G05D 1/0251
See application file for complete search history.

(56) References Cited

U.S. PATENT DOCUMENTS

| | | |
|---|---|---|
| 2006/0184274 A1 | 8/2006 | Sakai et al. |
| 2010/0315505 A1 | 12/2010 | Michalke et al. |
| 2014/0037136 A1 | 2/2014 | Ramalingam et al. |
| 2015/0347840 A1 | 12/2015 | Iida |
| 2017/0277197 A1* | 9/2017 | Liao .......................... G06T 7/20 |

OTHER PUBLICATIONS

International Preliminary Report on Patentability dated Jul. 9, 2020 in International Application PCT/US2018/066277.

* cited by examiner

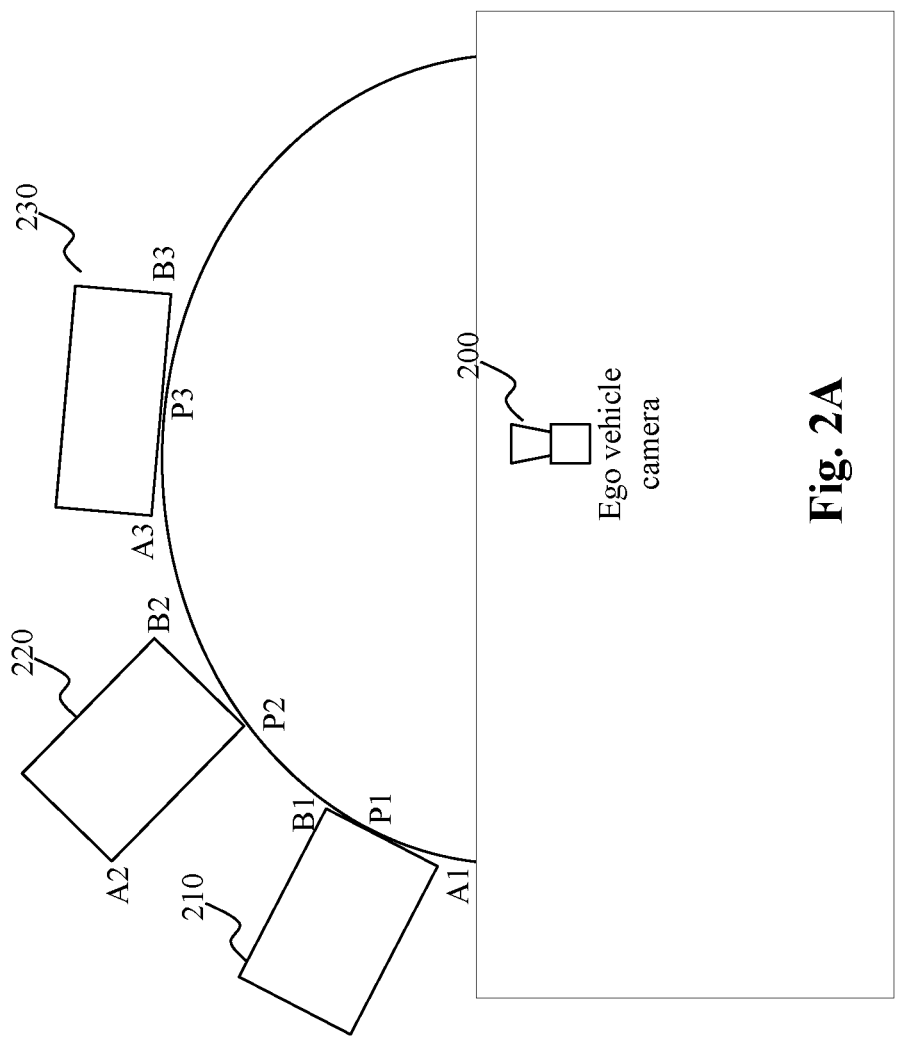

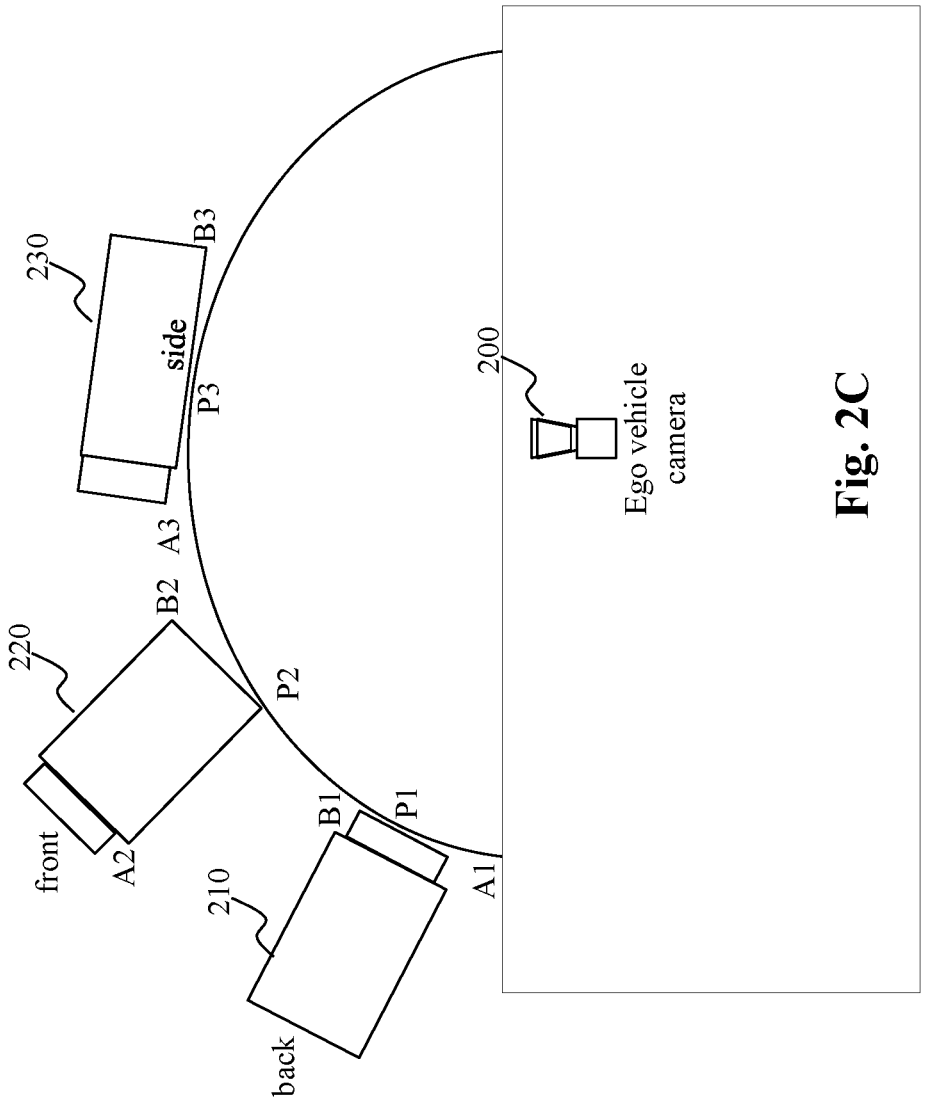

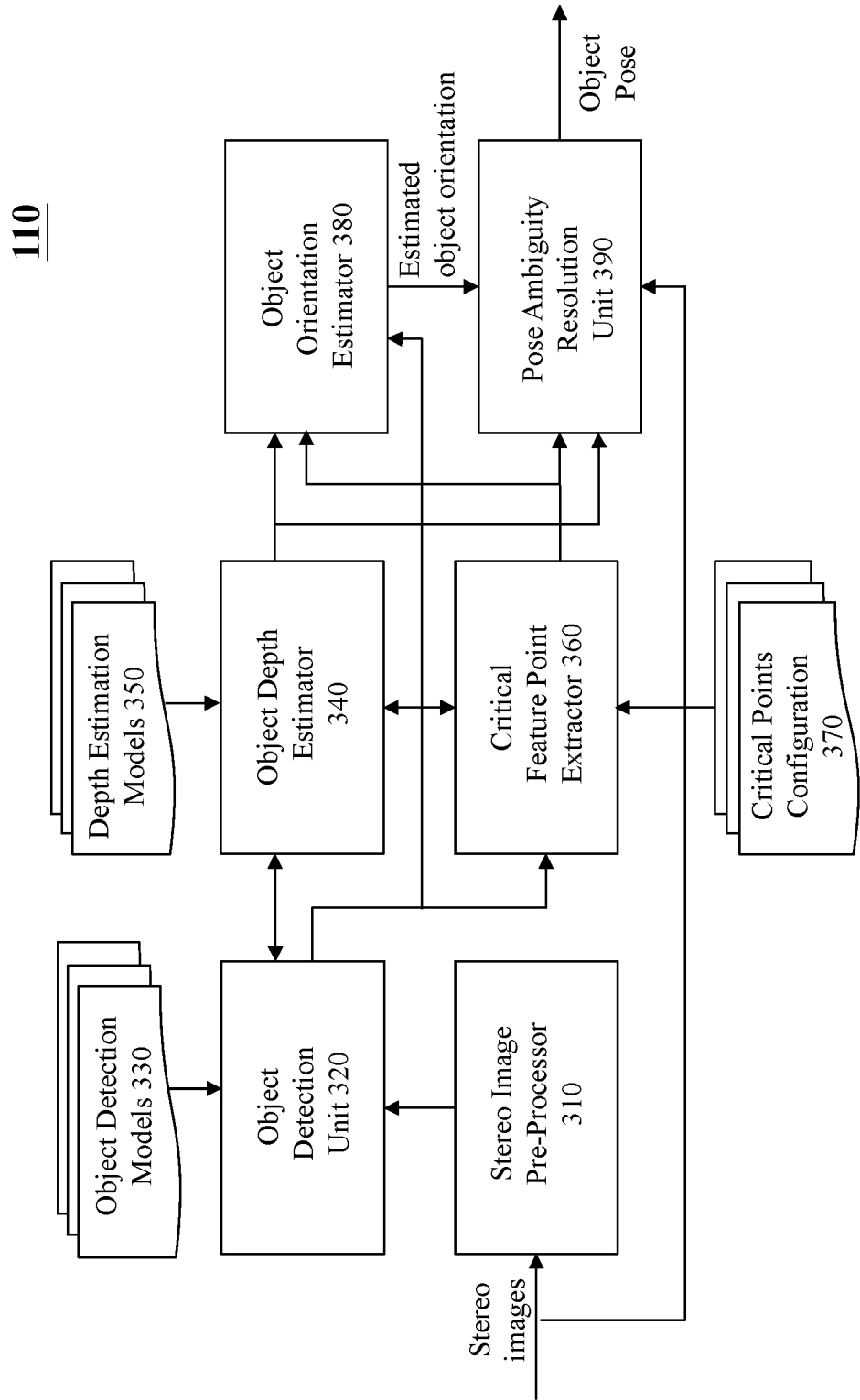

METHOD AND SYSTEM FOR STEREO BASED VEHICLE POSE ESTIMATION

CROSS-REFERENCE TO RELATED APPLICATIONS

This application claims priority to U.S. provisional application No. 62/612,195, filed Dec. 29, 2017, the contents of which are incorporated herein by reference in its entirety.

BACKGROUND

1. Technical Field

The present teaching generally relates to computer aided perception. More specifically, the present teaching relates to estimating information of an object.

2. Technical Background

With recent technological advancement in artificial intelligence (AI), there is a surge in applying AI in different application fields. This includes the field of autonomous driving, in which identifying objects and/or obstacles around a vehicle is essential to achieve obstacle avoidance and ensure safety. Traditionally, sensors are installed around a vehicle to continuously collect surrounding data. Such collected data are then analyzed in real-time to detect surrounding objects/obstacles. Particularly important is to be aware of any obstacle that s also moving. For example, measurements of any other moving vehicle that is nearby the ego vehicle, especially those that are moving towards the ego vehicle on a course of collision need to be made on-the-fly.

To effectively control obstacle avoidance, the distance between the ego vehicle and a surrounding object/obstacle is an important feature to estimate. In addition, the pose of an obstacle that represents a moving object is also important. For example, to devise an effective strategy in obstacle avoidance, knowing to where a nearby moving object is moving towards is essential. This involves estimation of the pose of the object. For instance, if it is estimated that a moving vehicle in front of an ego vehicle is heading the same direction as the ego vehicle, the danger it poses to the ego vehicle is smaller than another moving vehicle in front that is heading the opposite direction as the ego vehicle. Although other parameters may also be estimated to improve the awareness such as velocity of a nearby object, the pose of a nearby object, especially a moving object, is indispensable.

To facilitate prompt obstacle avoidance, pose estimation also needs to be performed on-the-fly. Traditionally, pose estimation in such tasks rely on information from sensors and in some situations from multiple sensors. For example, multiple cameras may be deployed on the ego vehicle to acquire multiple images from different perspectives in order to capture the surrounding scenes, e.g., stereo images or videos. Based on such stereo images of the same scene, depth map of the scene may be constructed and used in determining the distances between the objects in the scene and the ego vehicle. As it is known in the field, constructing a depth map from stereo images can be computationally intensive, making it more difficult to estimate pose of the obstacle objects on-the-fly. This consequently makes it more difficult to ensure that an ego vehicle can swiftly avoid obstacles in an ever-changing driving environment.

Therefore, there is a need to provide an improved solution for estimating the pose of an obstacle object in autonomous driving.

SUMMARY

The teachings disclosed herein relate to methods, systems, and programming for online services. More particularly, the present teaching relates to methods, systems, and programming for developing a virtual agent that can have a dialog with a user.

In one example, a method for estimating a pose of an object in autonomous driving is disclosed. Stereo images are obtained from a scene via at least two cameras deployed on an ego vehicle. Objects present in the scene are then detected from the stereo images. For each object detected, a plurality of feature points are identified and depth information associated with the feature points are obtained. An orientation of each object is then estimated based on the feature points and depth information of the object and the pose of the object is then estimated based on the orientation and additional features of the object.

In another example, a system for estimating a pose of an object in autonomous driving is disclosed. The system includes a stereo image pre-processor configured for obtaining stereo images of a scene from at least two cameras, an object detection unit configured for detecting an object present in the scene based on the stereo images, a critical feature point extractor configured for identifying a plurality of feature points of the object, an object depth estimator configured for determining at least depth information associated with the plurality of feature points, an object orientation estimator configured for estimating an orientation of the object based on the plurality of feature points and the depth information, and a pose ambiguity resolution unit configured for determining a pose of the object based on the orientation and additional features of the object.

Other concepts relate to software for implementing the present teaching on developing a virtual agent. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, machine readable non-transitory medium is disclosed, wherein the medium has information for estimating a pose of an object in autonomous driving recorded thereon so that the information, when read by the machine, causes the machine to perform various steps. Stereo images are obtained from a scene via at least two cameras deployed on an ego vehicle. Objects present in the scene are then detected from the stereo images. For each object detected, a plurality of feature points are identified, and depth information associated with the feature points are obtained. An orientation of each object is then estimated based on the feature points and depth information of the object and the pose of the object is then estimated based on the orientation and additional features of the object.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2A illustrates exemplary types of orientations that a nearby moving vehicle may have;

FIGS. 2B-2C illustrate exemplary ambiguities regarding poses for each illustrated orientation of a nearby moving vehicle;

FIG. 3 depicts an exemplary high-level system diagram of an object pose estimator, according to an embodiment of the present teaching;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure generally relates to systems, methods, medium, and other implementations directed to estimating pose of an object for the purpose of obstacle avoidance in the context of autonomous driving. In various embodiments, the present teaching discloses an efficient system, method, and medium for on-the-fly estimation of object pose to enable automatic on-the-fly obstacle avoidance. To overcome the problems mentioned related to traditional pose estimation approaches, the present teaching discloses a fast way to estimating the pose of a moving vehicle that is in the vicinity of an autonomous ego vehicle.

Figure 1:
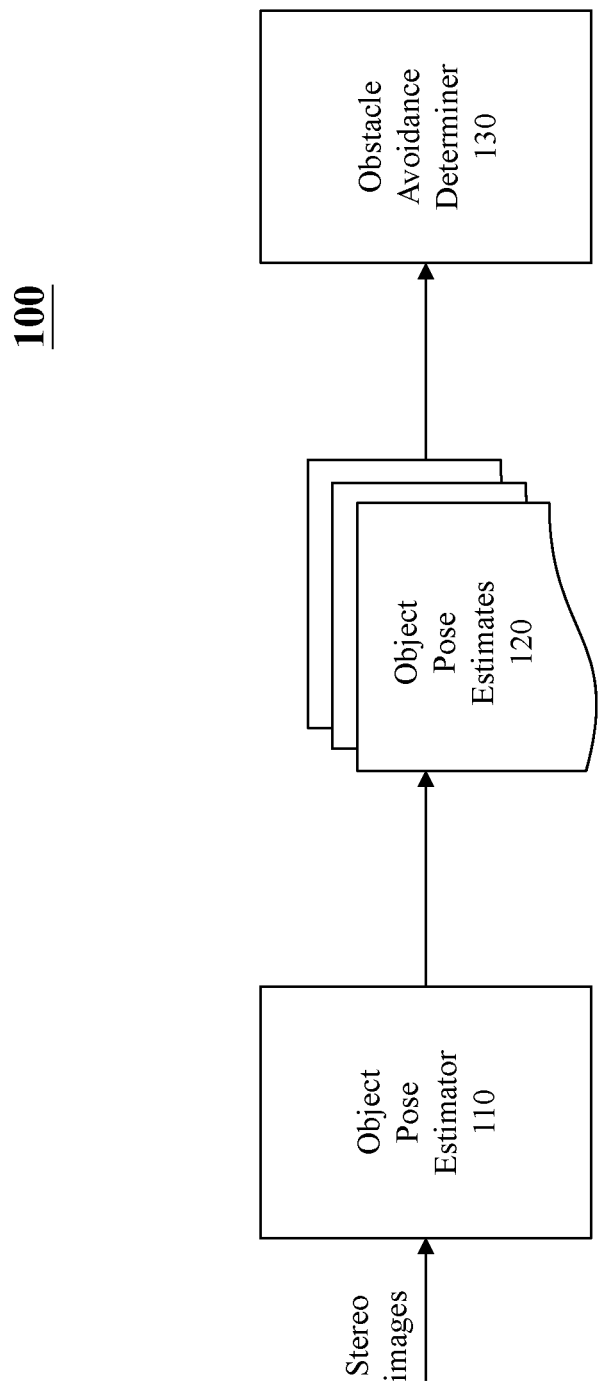
FIG. 1 depicts a general framework of computer aided obstacle avoidance in autonomous driving.

FIG. 1 depicts a general framework 100 of computer aided obstacle avoidance in autonomous driving. As shown, framework 100 comprises an object pose estimator 110, which provides object pose estimates 120 based on sensory information, and an obstacle avoidance controller 130, which takes the pose estimates of surrounding objects present in a scene visible to an ego vehicle to control the ego vehicle to avoid collision with any of the surrounding objects. The present teaching focuses on different aspects related to the object pose estimator 110.

FIG. 2A illustrates exemplary types of orientations that a nearby moving target vehicle may have. As shown, an ego vehicle may have one or more ego vehicle cameras 200, deployed on the vehicle and continuously monitor the visual scene surrounding the ego vehicle. An ego vehicle camera 200 may have a certain field of view, covering a certain relevant area around the ego vehicle. In this illustrated example, the illustrated ego vehicle camera covers a front area of the ego vehicle. There may be other ego vehicle cameras covering a monitoring area that may be, although with substantial overlap, slightly different from camera 200. Different cameras take pictures of the scene with different perspectives. Images taken with different perspectives may be used as stereo images (assuming proper calibration) to be used in different tasks such as depth estimation.

Figure 2B:
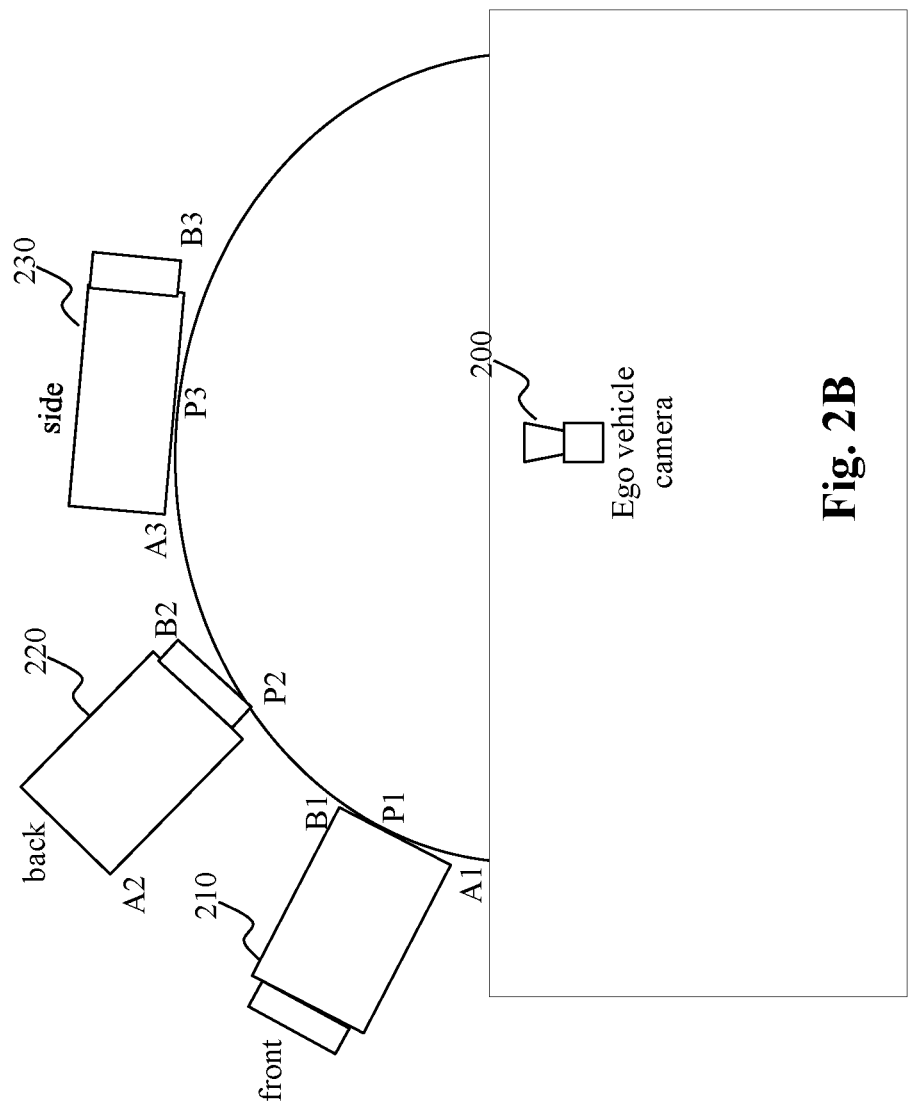

As seen, the ego vehicle camera 200 may observe different objects surrounding the ego vehicle, e.g., example objects, marked 210, 220, and 230, respectively. Each of the observed objects may have its own orientation and pose. FIG. 2A provides a summary of three orientations that are representative of all possible orientations including symmetric orientations (180-degree rotation). Each of the three orientations may correspond to two possible poses, which is illustrated in FIGS. 2B-2C FIG. 2B shows the same objects 210, 220, and 230, each having a certain orientation. For example, object 210 in FIG. 2A, although its orientation is clear, but does not reveal its pose without any further information. In FIG. 2B, the object 210 is shown to have a front end and a rear end, with its front end away from the ego vehicle and its rear end closer to the ego vehicle. But the same object in FIG. 2C has its front end closer to the ego vehicle and its rear end away from the ego vehicle. Similarly, objects 220 and 230 in FIG. 2A, when detected, present the same ambiguity as to the poses without more information. But in FIGS. 2B and 2C, as additional information is made available, e.g., whether features from their front, rear, or side views are observed, their poses can be estimated based on such additional features. It is evident that resolution to such pose related ambiguity is critically important to obstacle avoidance.

FIG. 3 depicts an exemplary high-level system diagram of the object pose estimator 110, according to an embodiment of the present teaching. In this illustrated embodiment, the object pose estimator 110 comprises a stereo image pre-processor 310, an object detection unit 320, an object depth estimator 340, a critical feature point extractor 360, an object orientation estimator 380, and a pose ambiguity resolution unit 390. In the illustrated embodiment, the stereo images acquired on-the-fly are received as input and the estimated object poses are generated dynamically on-the-fly as output. Depending on the number of objects in the surrounding environment of an ego vehicle, the number of object poses estimated varies. Each object pose is estimated based on an estimated orientation of the object. The orientation of the object is estimated based on various critical feature points of the object identified based on the object detected based on, e.g., object detection models 330, and the depth information of the object determined based on depth estimation models 350.

Figure 4:
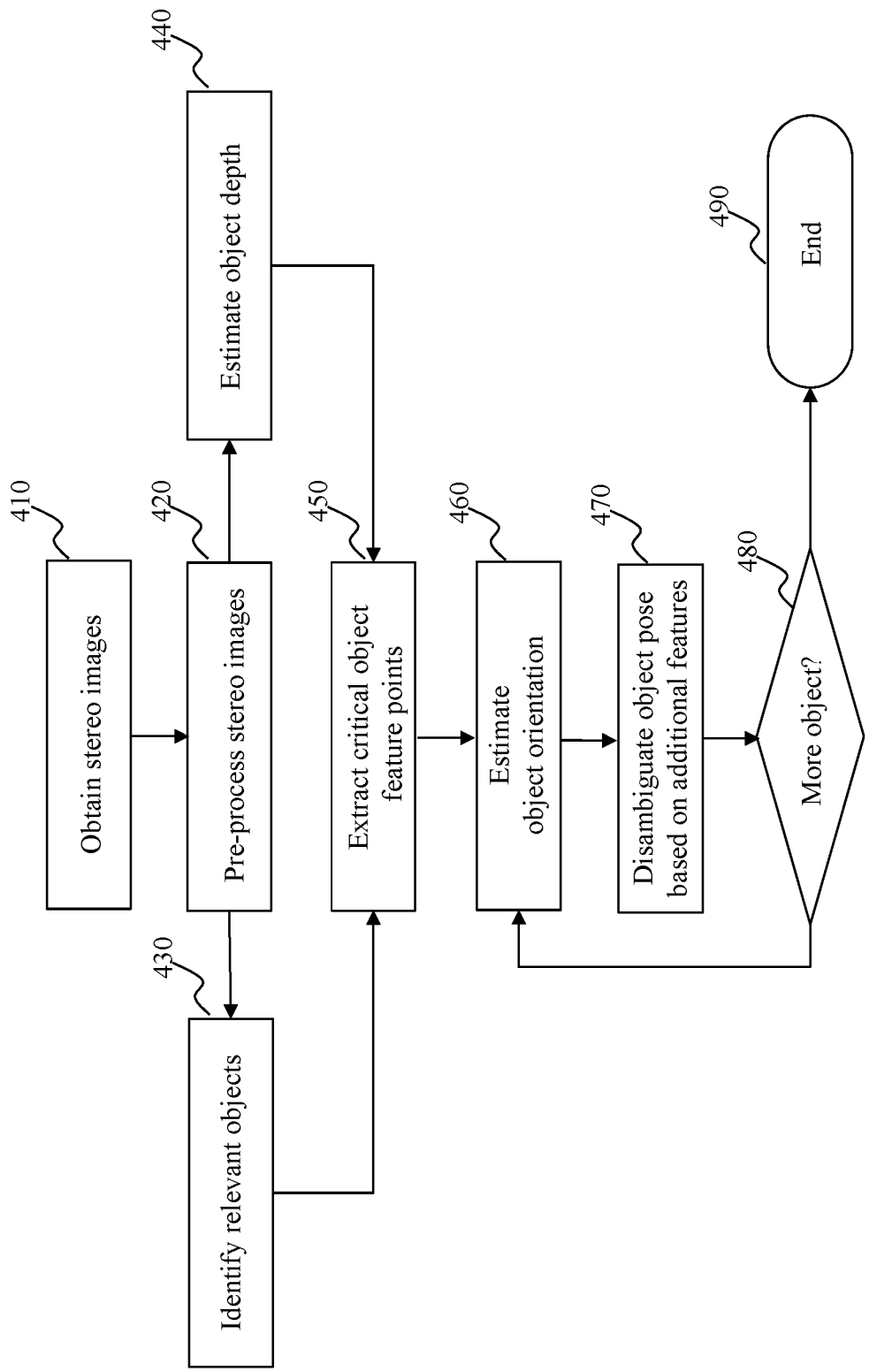
FIG. 4 is a flowchart of an exemplary process of an object pose estimator, according to an embodiment of the present teaching.

FIG. 4 is a flowchart of an exemplary process of the object pose estimator 110, according to an embodiment of the present teaching. In operation, the stereo-image pre-processor 310 receives, at 410, stereo images acquired by multiple cameras deployed on the ego vehicle from the scene surrounding the ego vehicle. In some embodiments, certain pre-processing may be performed, at 420 by the stereo-image pre-processing unit 310, on the stereo images, e.g., noise reduction or image enhancement. Based on the pre-processed stereo images, the object detection unit 320 detects, at 430, objects present in the scene based on the object detection models 330. Based on the detected objects, the object depth estimator 340 estimates, at 440, the depth information. In some embodiments, depth information may be estimated with respect to each of the detected objects, e.g., based on the depth estimation models 350. In some embodiments, the depth map of the entire scene may be estimated, and the depth map of the scene may also be used by the object detection unit 320 to facilitate object detection. In some embodiments, certain sensor(s) deployed on the ego vehicle may provide directly depth information (3D sensor and 3D images not shown).

With detected objects and depth information, the critical feature point extractor 360 identifies or extracts, at 450, various critical feature points for each of the detected objects. Such critical feature points may be detected based on critical point configurations. For example, critical feature points may be configured to be, as illustrated in FIGS. 2A-2C, a left most point A of each object, a right most point B of each object, and a nearest point P representing the point of an object that is closest to the ego vehicle. The left most and the right most are defined from the perspective of the camera of the ego vehicle. A nearest point P of an object is determined based on the depth information associated with the object. For example, in FIG. 2A, there are three illustrated objects 210, 220, and 230. Object 210 has critical feature points A1, B1, and P1; object 2 has critical feature points A2, B2, and P2; and object 3 has critical feature points A3, B3, and P3.

With critical feature points for each object detected, the object orientation estimator 380 determines, at 460, the orientation for each of the detected objects based on the critical feature points and the depth information associated therewith. As discussed herein, there are three representative orientations of any object, as shown in FIG. 2A, with object 210 having a first orientation, object 230 having a second orientation, and object 220 having a third orientation. According to the present teaching, with respect to a detected object, if critical feature points A, B, and P forms a straight line, determined based on the depth information of the object, the orientation of the object is either the first of the second orientation. In some embodiments, to determine whether an object is in the first or second orientation when all three critical feature points form a straight line, the distance between critical point A and B is used against some criterion. For example, when the object is a target vehicle in front of the ego vehicle (which can be determined based on visual cues such as shape of the color blobs, etc.), if the distance between A and B is smaller than some threshold (the criterion), the orientation of the moving vehicle is aligned perpendicular to the line formed by points A and B, such as object 210 in FIG. 2A. If the distance between A and B is larger than the threshold, then the moving vehicle has an orientation that is parallel to the line formed by points A and B, such as object 230 in FIG. 2A.

The criterion used to select between the first (210) and second (230) orientation may be determined based on dynamic information such as the depth information associated with each object as well as the general knowledge about the dimension of moving vehicles. For instance, if the object or the target vehicle is close to the ego vehicle, say 2.5 meters (estimated depth is 2.5 meters), then the dynamic threshold may be determined based on an average width of moving vehicles calibrated in accordance with the known distance 2.5 meters. In this way, for each of the target vehicle detected, the threshold to be applied to determine its orientation may be adaptively determined on-the-fly in accordance with the depth information associated with the object. Other visual cues may also be used to adaptively determine the threshold on width. For example, from the shape of the moving vehicle, it may be determined whether it corresponds to a van or a sedan. The former has a larger average width, but the latter has a smaller average width. Such determined average width with respect to each specific object may then be adjusted to derive the width threshold based on the depth information of the object. The farther away the object is, the smaller the adjusted width will be.

When the critical feature points of an object do not form a straight line, there are also two possible orientations. One is the orientation of object 220 in FIG. 2A. In this case, the moving vehicle is aligned with line formed by critical feature points A and P. The other orientation (now shown in FIG. 2A-2C) corresponds to one in which the object is aligned with the line formed by critical feature points P and B. According to the present teaching, to determine the orientation of the object when the three critical feature points do not form a straight line, the distance between A and P is compared with the distance between P and B. If the former distance is larger, then the object is aligned with the line formed by critical feature points A and P. Otherwise, the object is aligned with the line formed by critical feature points P and B.

As discussed herein, once the orientation of a detected object is determined, there are different possible poses for the object. For example, target vehicle 210 in FIG. 2A may have two possible poses, one as presented in FIG. 2B (tail end of the moving vehicle is visible from the ego vehicle's camera) and the other as presented in FIG. 2C (the head end of the moving vehicle is visible from the ego vehicle's camera). Target vehicle 220 in FIG. 2A has the similar ambiguity (whether it is the tail or head end of the moving vehicle closer to the ego vehicle). Target vehicle 230 may also have two different poses given that orientation, one being that the head of the moving vehicle 230 is heading to the right (FIG. 2B) and the other heading to the left (FIG. 2C) of the ego vehicle. The ambiguity associated with each orientation of an object may be further resolved, at 470 (FIG. 4) by the pose ambiguity resolution unit 390. The process of estimating the orientations and poses of the detected objects continues until all objects have been processed, determined at 480.

Figure 5:
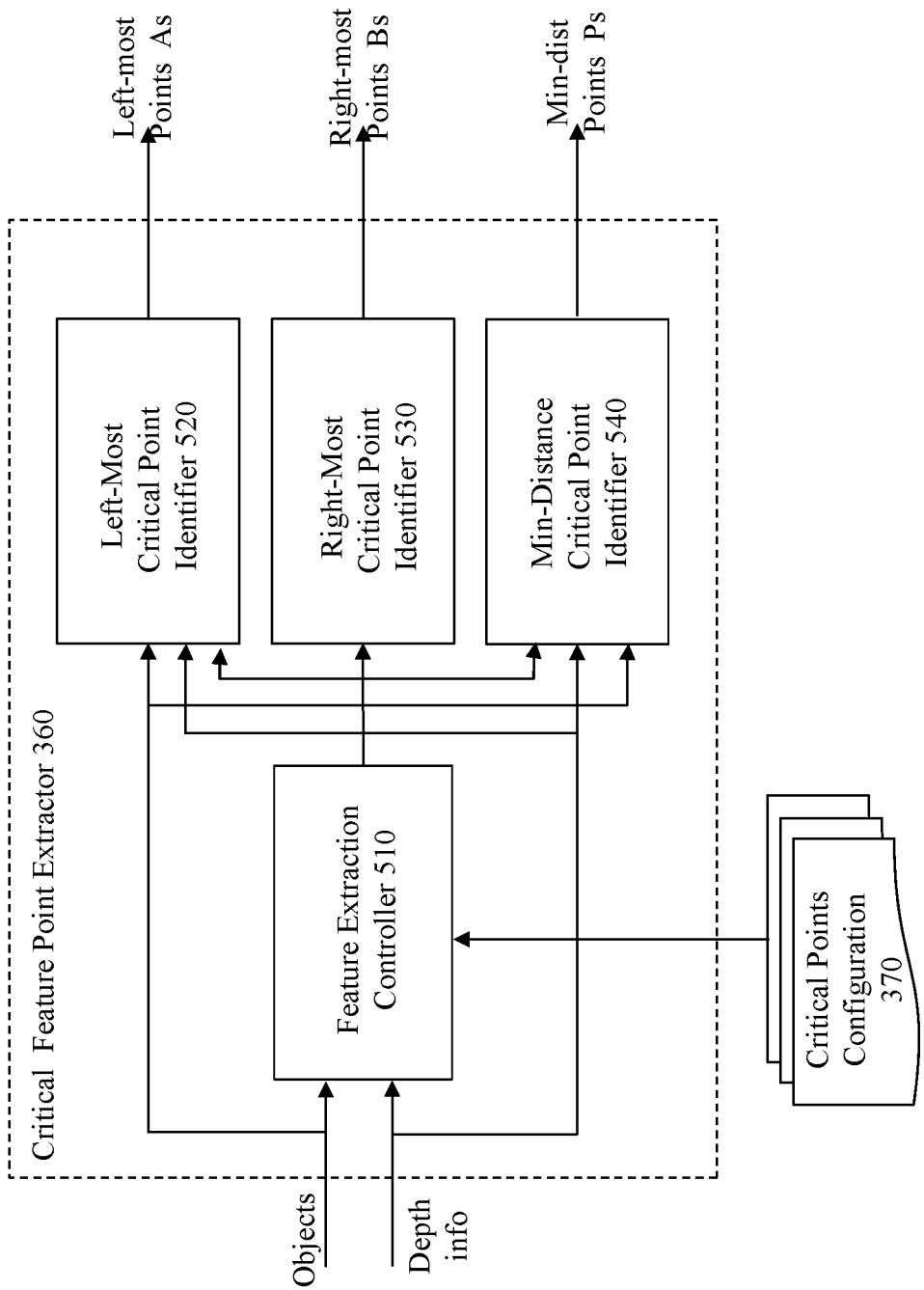
FIG. 5 depicts an exemplary high-level system diagram of a critical feature point estimator, according to a critical feature point estimator, according to an embodiment of the present teaching.

FIG. 5 depicts an exemplary high-level system diagram of the critical feature point estimator 360, according to a critical feature point estimator, according to an embodiment of the present teaching. In the illustrated embodiment, the critical feature point estimator 360 takes detected objects and their associated depth information as input and generates critical feature points for all the detected objects as output. To achieve that, the critical feature point estimator 360 comprises a feature extraction controller 510, a left-most critical point identifier 520, a right-most critical point identifier 530, and a min-distance critical point identifier 540. As discussed herein, the feature point extraction may be carried out based on some pre-configured information, e.g., stored in the critical points configuration 370. Based on the configuration, the feature extraction controller 510 controls the feature extraction by invoking different components to extract different critical feature points.

Figure 6:
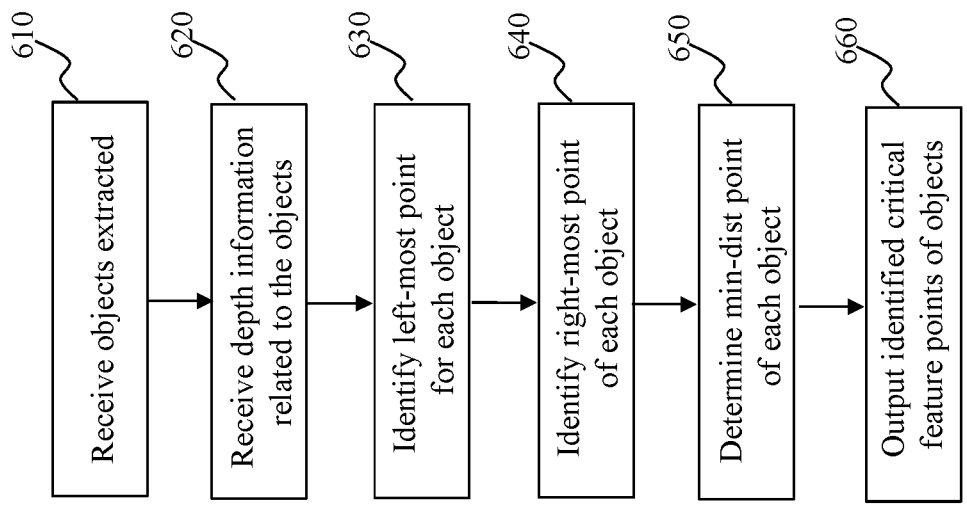
FIG. 6 is a flowchart of an exemplary process of a critical feature point estimator, according to an embodiment of the present teaching.

FIG. 6 is a flowchart of an exemplary process of the critical feature point estimator 360, according to an embodiment of the present teaching. In operation, the feature extraction controller 510 receives the detected objects, at 610, and the depth information associated with such detected objects, at 620. Based on the configuration in 370, the feature extraction controller 510 then invokes the left-most critical point identifier 520 to identify, at 630, the left most critical points for all detected objects based on the object and associated depth information. Similarly, the feature extraction controller 510 invokes the right-most critical point identifier 530 to identify, at 640, the right most critical points of all detected objects based on the object and associated depth information. The feature extraction controller 510 also invokes the min-distance critical point identifier 540 to identify, at 650, the minimum distance critical points of all detected objects based on the object and associated depth information. At 660, the extracted critical feature points of the detected objects are output to the object orientation estimator 380 for orientation estimation.

Figure 7:
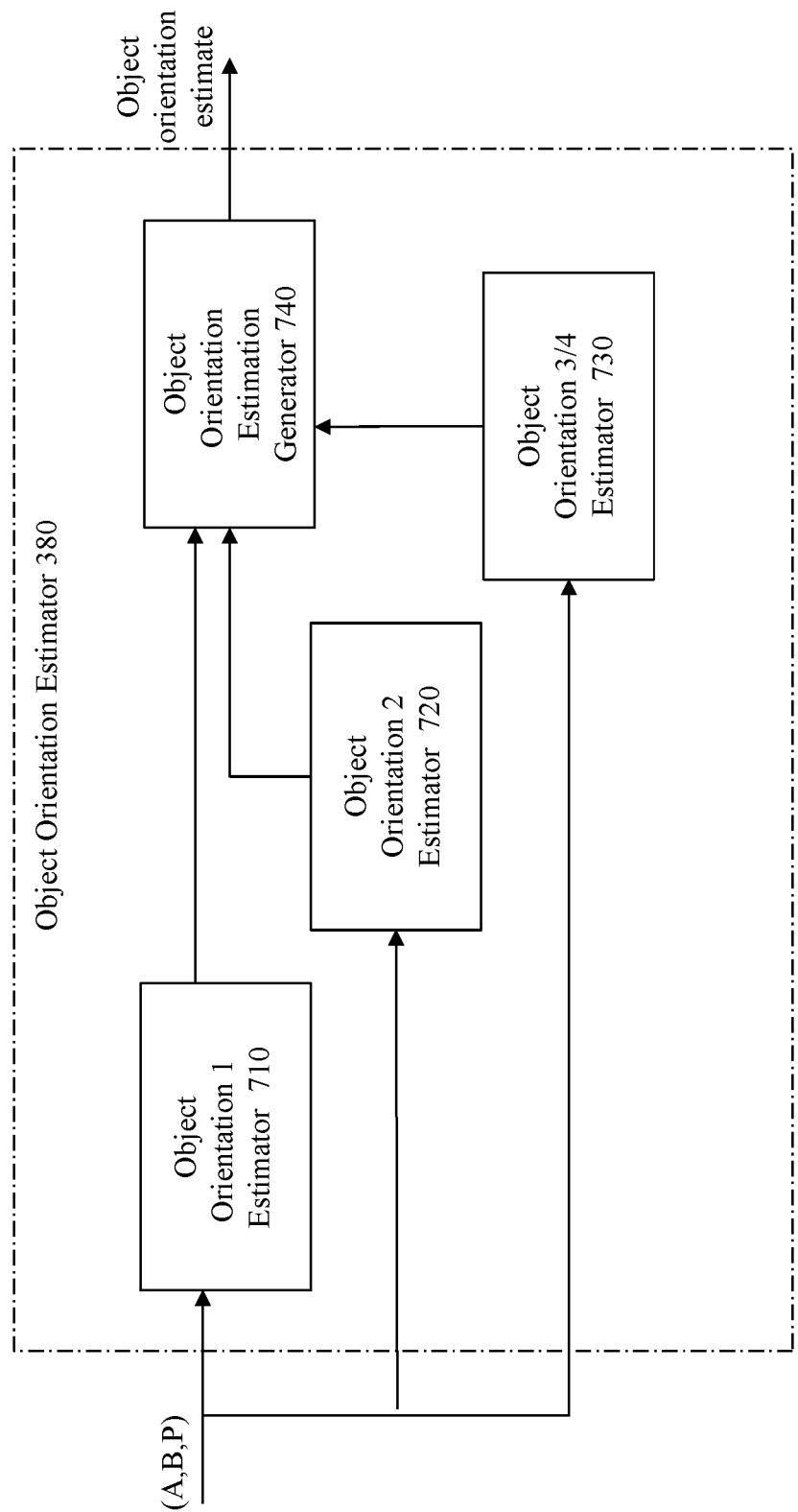
FIG. 7 depicts an exemplary high-level system diagram of an object orientation estimator, according to an embodiment of the present teaching.

FIG. 7 depicts an exemplary high-level system diagram of the object orientation estimator 380, according to an embodiment of the present teaching. To estimate the orientation of each object, the object orientation estimator 380 comprises an object orientation 1 estimator 710, an object orientation 2 estimator 730, an object orientation 3/4 estimator 720, and an object orientation estimation generator 740. Each object orientation estimator is provided to estimate a specific orientation. For example, estimator 710 is for estimating the orientation 1 such as object 210 in FIG. 2A; estimator 720 is for estimating orientation 2 (230 in FIG. 2A); and estimator 720 is for estimating orientation 3 such as object 220 in FIG. 2A and orientation 4 (not shown) which is when the object 220 is aligned with the line formed by points P2 and B2.

Figure 8:
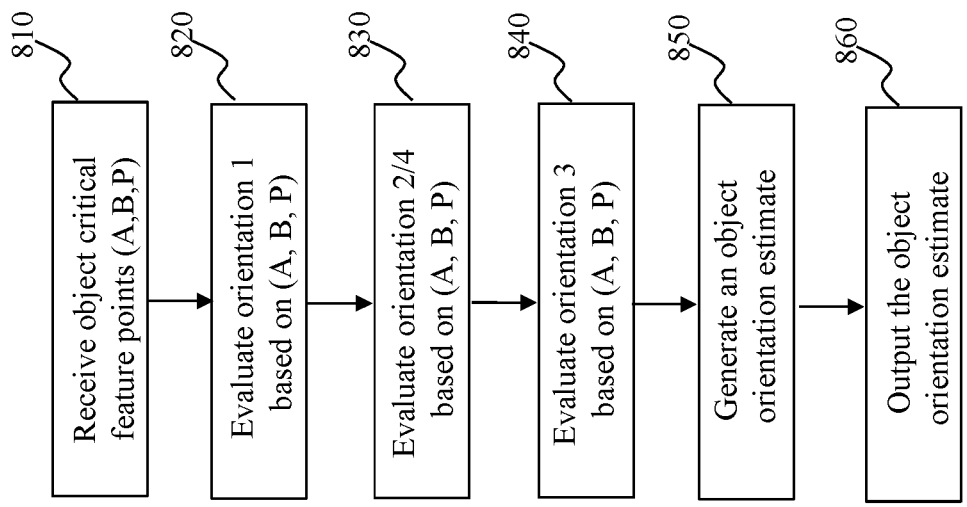
FIG. 8 is a flowchart of an exemplary process of an object orientation estimator, according to an embodiment of the present teaching.

FIG. 8 is a flowchart of an exemplary process of the object orientation estimator 380, according to an embodiment of the present teaching. In operation, the critical feature points of each object may be received, at 810, in the form a triple (A, B, P). Each of the estimators evaluates its designated orientation. For example, the object orientation 1 estimator 710 evaluates, at 820, (A, B, P) with respect to orientation 1 and sends its evaluation result to the object orientation estimation generator 740. Similarly, the object orientation 2 estimator 720 evaluates, at 830, (A, B, P) with respect to orientation 2. The object orientation 3 estimator 730 evaluates, at 840, (A, B, P) with respect to orientation 3 and 4 and sends its evaluation result to the object orientation estimation generator 740. With the results from the different estimators for different orientations, the object orientation estimation generator 740 may then generate, at 850, an object orientation estimate and outputs, at 860, such generated orientation estimate for each of the objects detected.

As discussed herein, for each estimated orientation, there are two possible poses of the target vehicle, which correspond to 180 degree with respect with each other, as shown in FIGS. 2B and 2C. The ambiguity may be resolved by identifying additional features related to the front or rear sides of each target vehicle. Such additional features may be observed when the visual features of the front or the rear views of the target vehicle may be seen substantially fully in the first (210) and the third (220) orientations. When the target vehicle is in the second orientation (230), the features of the front or the rear views of the target vehicle may be visible only from a different perspective or only features of the side view of the front and rear of the target vehicle are visible. For example, if a target vehicle is in the first orientation with its head facing the ego vehicle (210 as shown in FIG. 2C), then the camera on the ego vehicle will observe the front features of the target vehicle. If a target vehicle is in the first orientation but with its head away from the ego vehicle (210 as shown in FIG. 2B), then the camera on the ego vehicle will observe the rear features of the target vehicle. Similarly, if a target vehicle is in the third orientation with its head facing the ego vehicle (220 in FIG. 2B), then the camera on the ego vehicle will observe the front features of the target vehicle. If a target vehicle is in the third orientation but with its head away from the ego vehicle (220 in FIG. 2C), then the camera on the ego vehicle will observe the rear features of the target vehicle. If a target vehicle is in the second orientation with its head towards the right of the ego vehicle (230 in FIG. 2B), then the ego vehicle should observe the features of the front of the target vehicle from the right side of the target vehicle and the features of the rear end of the target vehicle on the left of the target vehicle. If a target vehicle is in the third orientation but with its head towards the left of the ego vehicle (230 in FIG. 2C), then the ego vehicle should observe the features of the front end of the target vehicle on the left side of the target vehicle and the features of the rear end from the right side of the target vehicle on.

Figure 9:
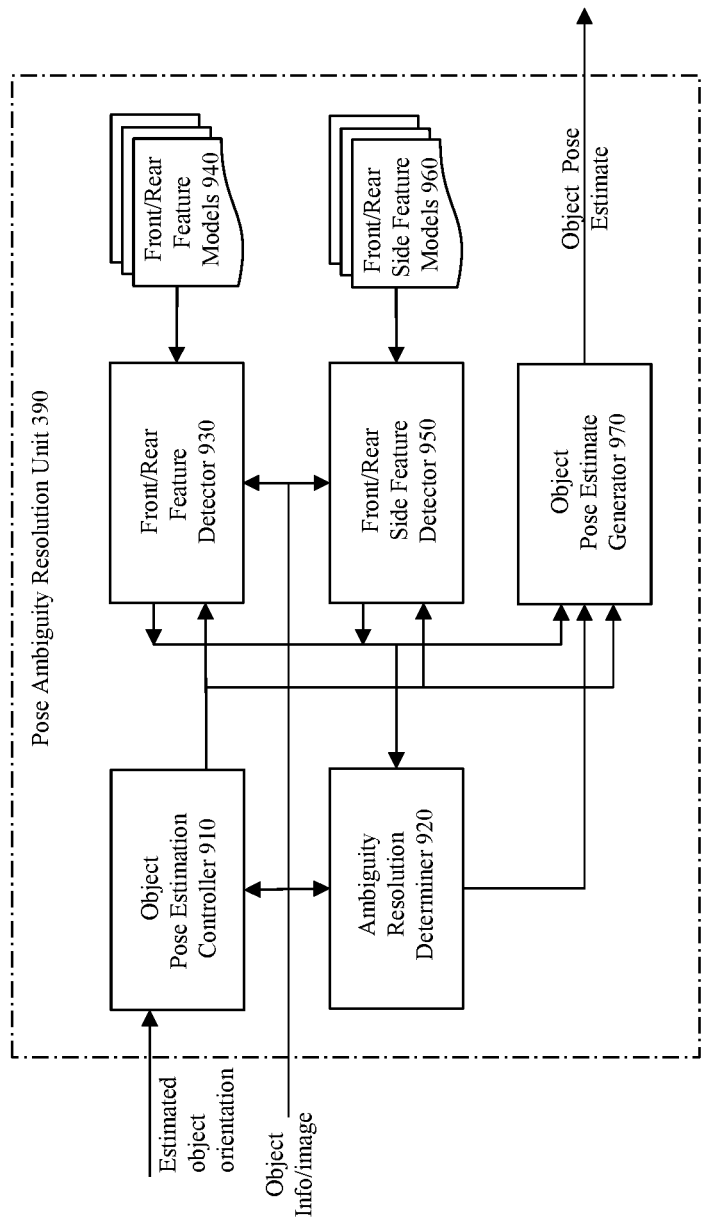
FIG. 9 depicts an exemplary high-level system diagram of a pose ambiguity resolution unit, according to an embodiment of the present teaching.

As discussed herein, the pose ambiguity resolution unit 390 is for resolving the ambiguity of two possible poses for an estimated orientation of each target vehicle observed from the ego vehicle. FIG. 9 depicts an exemplary high-level system diagram of the pose ambiguity resolution unit 390, according to an embodiment of the present teaching. In this illustrated embodiment, the pose ambiguity resolution unit 390 comprises an object pose estimation controller 910, an ambiguity resolution determiner 920, a front/rear feature detector 930, a front/rear side feature detector 950, and an object pose estimation generator 960. Upon receiving an estimated object orientation, the object pose estimation controller 910 determines, based on the estimated orientation, whether to invoke the front/rear feature detector 930 or the front/rear side feature detector 950. As discussed herein, when the estimated orientation is orientation 1 (210) or orientation 2 (220), the front or rear features observable from the target vehicle are to be used to disambiguate. In this case, the front/rear feature detector 930 is invoked to detect front or rear features from the images containing the target image based on, e.g., front/rear feature models stored in 940. The detection result may indicate what (front or rear features) are observed from the target vehicle and may be sent to the ambiguity resolution determiner 920 to estimate the pose by removing the ambiguity based on the detected features of the target vehicle.

On the other hand, when the estimated orientation is orientation 3 (230), the side views of the front or rear features observable from the target vehicle in orientation 3 are to be used to disambiguate. In this case, the front/rear side feature detector 950 is invoked to detect which side of the target vehicle 230 corresponds to the side view of the front or rear features from the images containing the target image based on, e.g., front/rear side feature models stored in 960. The detection result may indicate whether the front or rear features are observed on the left side or the right side of the target vehicle and such indication may be sent to the ambiguity resolution determiner 920 to estimate the pose of the target vehicle by removing the ambiguity based on which side the front of the target vehicle is located.

Figure 10:
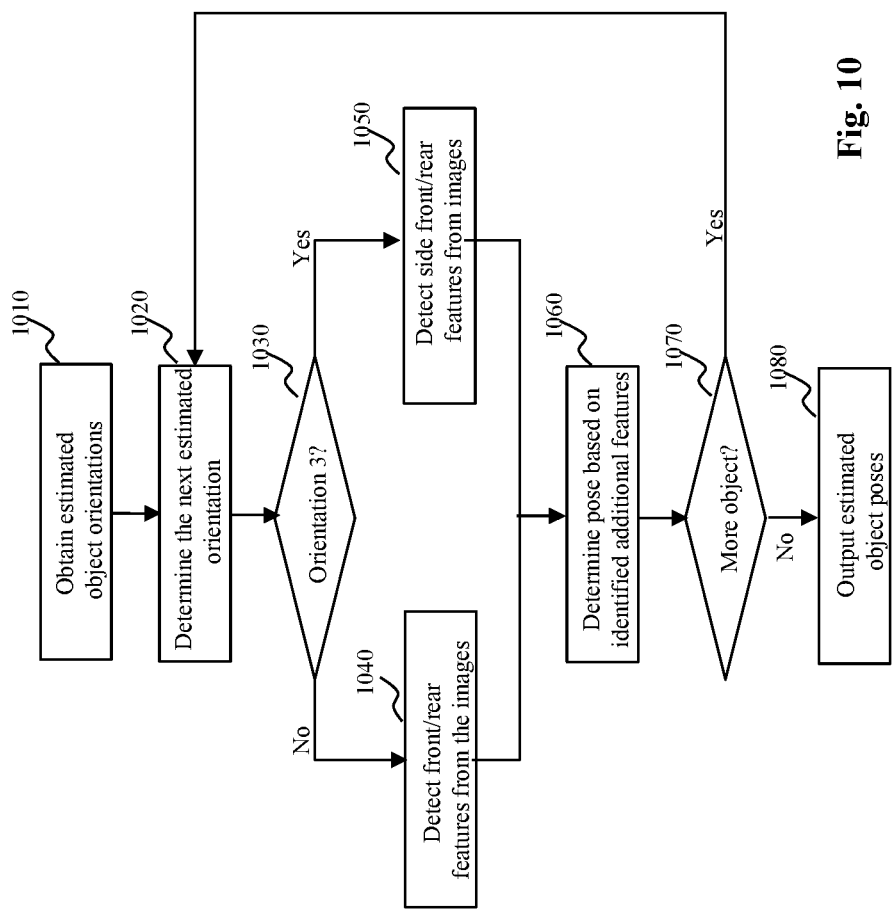
FIG. 10 is a flowchart of an exemplary process of a pose ambiguity resolution unit, according to an embodiment of the present teaching.

FIG. 10 is a flowchart of an exemplary process of the pose ambiguity resolution unit 390, according to an embodiment of the present teaching. At 1010, the object pose estimation controller 910 receives estimated orientations corresponding to target vehicles detected from a scene. The orientation of a next target vehicle is determined from the input at 1020 and used to determine, at 1030, whether it corresponds to orientation 3 (object 230 in FIG. 2A). If the estimated orientation is not orientation 3 (i.e., it is either orientation 1 or orientation 2), the object pose estimation controller 910 invokes the front/rear feature detector 930 to detect, at 1040, front or rear features of the target vehicle based on front/rear feature models stored in 940. If the estimated orientation is orientation 3, the object pose estimation controller 910 invokes the front/rear side feature detector 930 to detect, at 1050, the side view of the front or rear features of the target vehicle based on front/rear side feature models stored in 960.

The detected additional features associated with the target vehicle are then sent to the ambiguity resolution determiner 920 to determine, at 1060, the pose of the target object. The process returns to step 1020 when there is more remaining object, determined at 1070. In some embodiments, when the poses of all target vehicles are determined, they are generated, by the object pose estimate generator 970, and output at 1080. In some embodiments, an alternative process may output the estimated pose for each of the target vehicles whenever it is estimated (not shown).

In some embodiment, the front features of a target vehicle may include headlights of the target vehicle or, e.g., special symbols for different types of vehicles such as a logo of the vehicle. What are to be expected to be observable from the front or from the rear end of a target vehicle may be configured and specified in the storage 940 and they are used to guide the detection. In some embodiments, rear features of a target vehicle may also be configured and specified in storage 940 and be used to guide the detection of rear features, which may include a license plate, textual markings of the brand of the target vehicle, etc. Different possibilities across different vehicles may also be configured. In addition, different configurations of locations of different expected features (e.g., license plate, headlight locations, or rear light locations) may also be configured.

Side views of a target vehicle may include the profile of the front or rear of a target vehicle or the visual features of the vehicle visible from the side of the vehicle such as profile of the entire vehicle or configuration of side windows of the vehicle. What are expected to be seen from sides of different vehicles may also be configured and specified in storage 960 and are used for detecting additional side features from different target vehicles.

Figure 11:
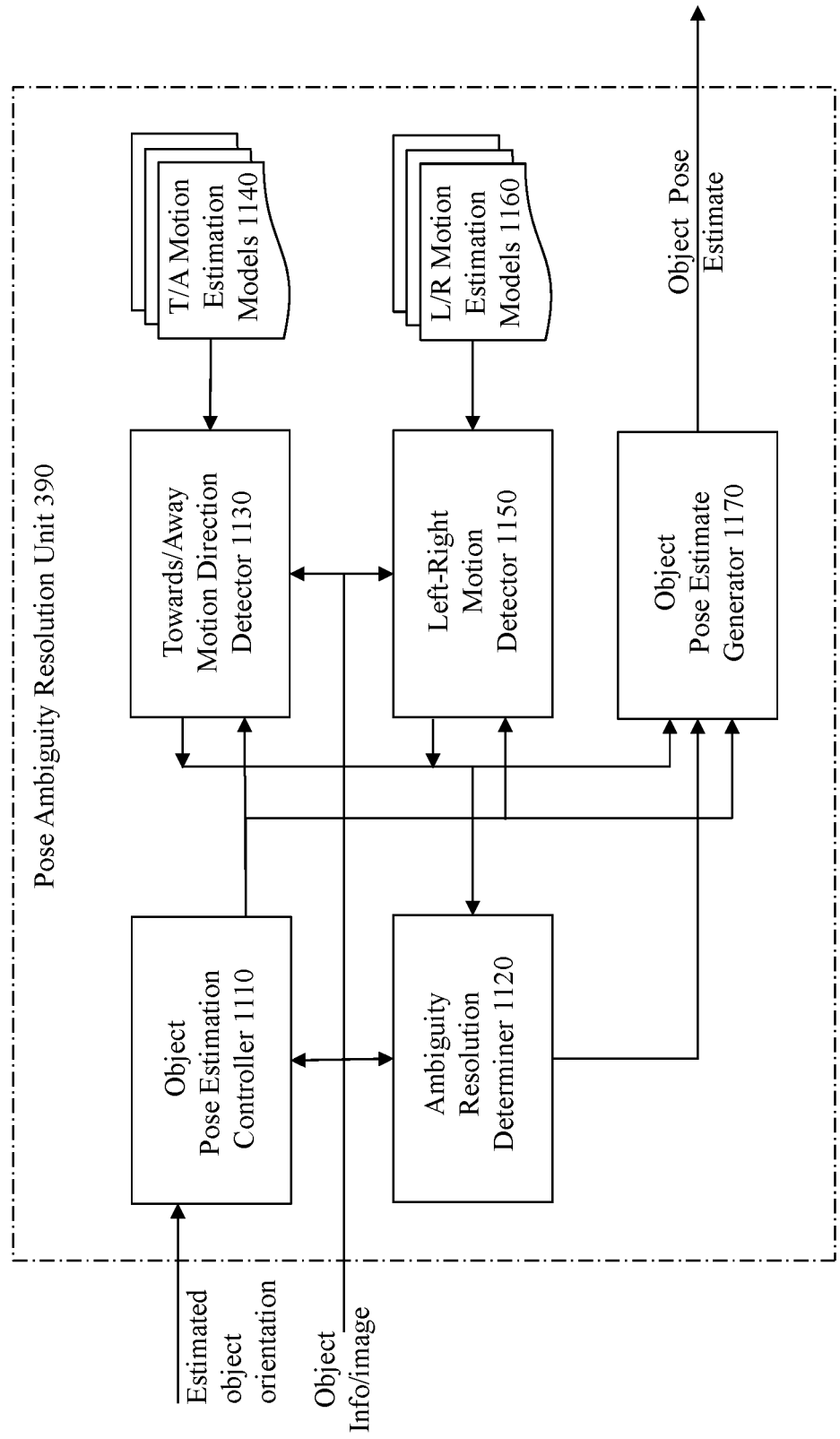
FIG. 11 depicts another exemplary high-level system diagram of a pose ambiguity resolution unit, according to an embodiment of the present teaching.

In some embodiments, other features may also be used to disambiguate the pose of a target vehicle. For example, motion information may be used to determine the location of the front or rear of the target vehicle and hence, the pose of the target vehicle. FIG. 11 depicts an exemplary high-level system diagram of the pose ambiguity resolution unit 390, according to a different embodiment of the present teaching. In this illustrated embodiment, the pose ambiguity resolution unit 390 comprises an object pose estimation controller 1110, an ambiguity resolution determiner 1120, a towards/away motion detector 1130, a left/right motion detector 1150, an object pose estimation generator 1170. Upon receiving an estimated object orientation, the object pose estimation controller 1110 determines, based on the estimated orientation, whether to invoke the towards/away motion detector 1130 or the left/right motion detector 1150. When the estimated orientation is orientation 1 (210) or orientation 2 (220), the motion of the target vehicle is either towards or away from the ego vehicle (or no motion, which will be the same for either towards or away motion). The direction of the motion may then be used to disambiguate the pose of the target vehicle. In this case, the towards/away motion detector 1130 is invoked to detect the motion direction based on, e.g., T/A motion estimation models 1140. The detected motion direction may then be sent to the ambiguity resolution determiner 1120 to remove the ambiguity based on the directionality of the motion of the target vehicle.

On the other hand, when the estimated orientation is orientation 3 (230), the direction (left or right) of the motion of the target vehicle may also be used to disambiguate. In this case, the L/R motion detector 1150 is invoked to estimate the directionality of the motion of the target vehicle based on, e.g., L/R motion estimation models stored in 1160. The detection result may be sent to the ambiguity resolution determiner 1120 to estimate the pose of the target vehicle by removing the ambiguity based on the directionality of the motion detected.

Figure 12:
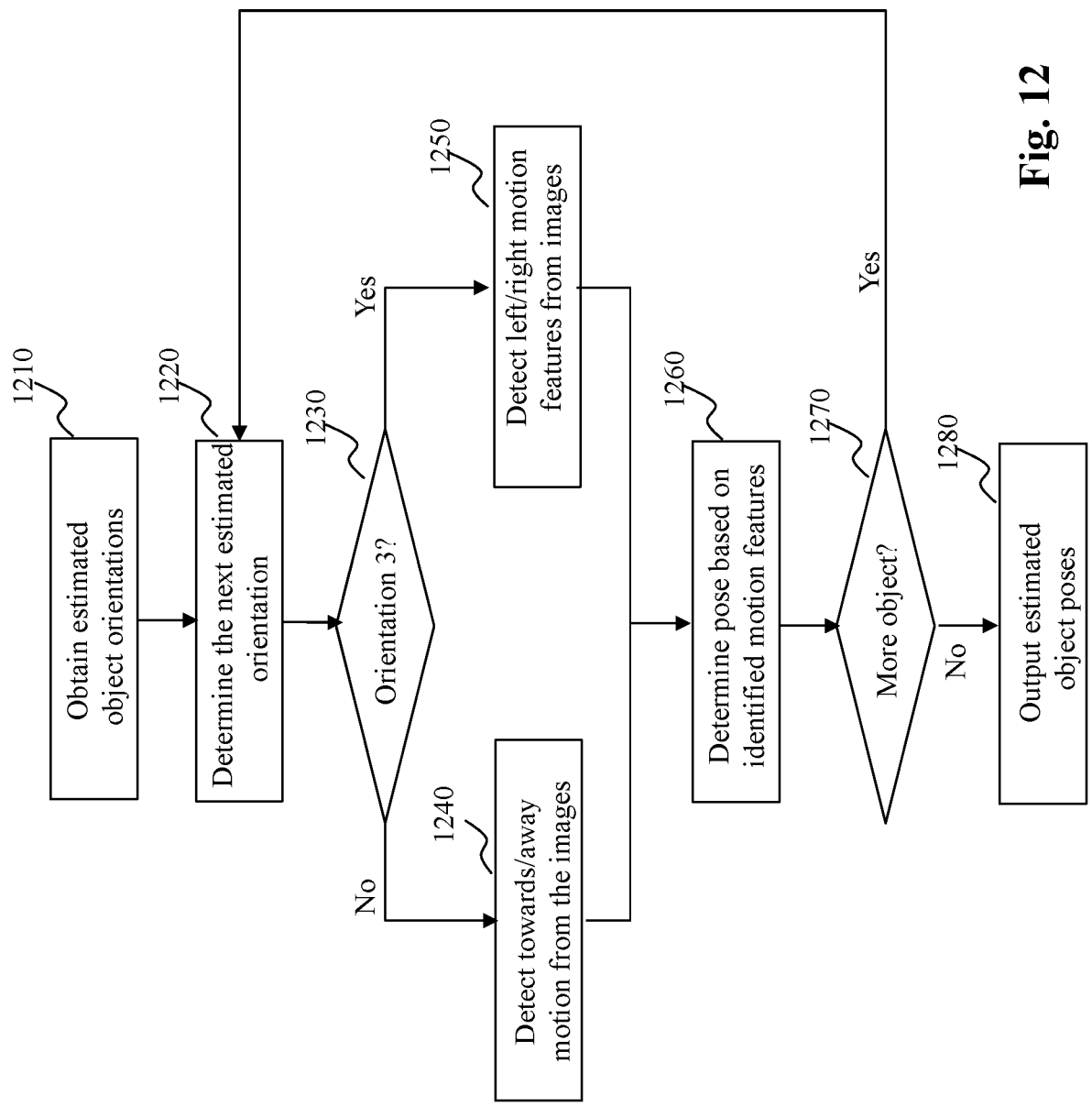
FIG. 12 is a flowchart of another exemplary process of a pose ambiguity resolution unit, according to an embodiment of the present teaching.

FIG. 12 is a flowchart of another exemplary process of the pose ambiguity resolution unit 390, according to a different embodiment of the present teaching. At 1210, the object pose estimation controller 1110 receives estimated orientations corresponding to target vehicles detected from a scene. The orientation of a next target vehicle is determined from the input at 1220 and used to determine, at 1230, whether it corresponds to orientation 3 (object 230 in FIG. 2A). If the estimated orientation is not orientation 3 (i.e., it is either orientation 1 or orientation 2), the object pose estimation controller 1110 invokes the towards/away motion detector 1130 to detect, at 1240, whether the target vehicle is heading towards or away from the ego vehicle based on, e.g., T/A motion estimation models stored in 1140. If the estimated orientation is orientation 3, the object pose estimation controller 1110 invokes the L/R motion detector 1130 to detect, at 1250, whether the target vehicle is heading to the left or the right direction of the ego vehicle based on, e.g., L/R motion estimation models stored in 1160.

The detected motion features associated with the target vehicle are then sent to the ambiguity resolution determiner 1120 to determine, at 1260, the pose of the target vehicle. The process returns to step 1220 when there is more remaining object, determined at 1270. In some embodiments, when the poses of all target vehicles are determined, they are output at 1280. In some embodiments, an alternative process may output the estimated pose for each of the target vehicles whenever it is estimated (not shown).

Figure 13:
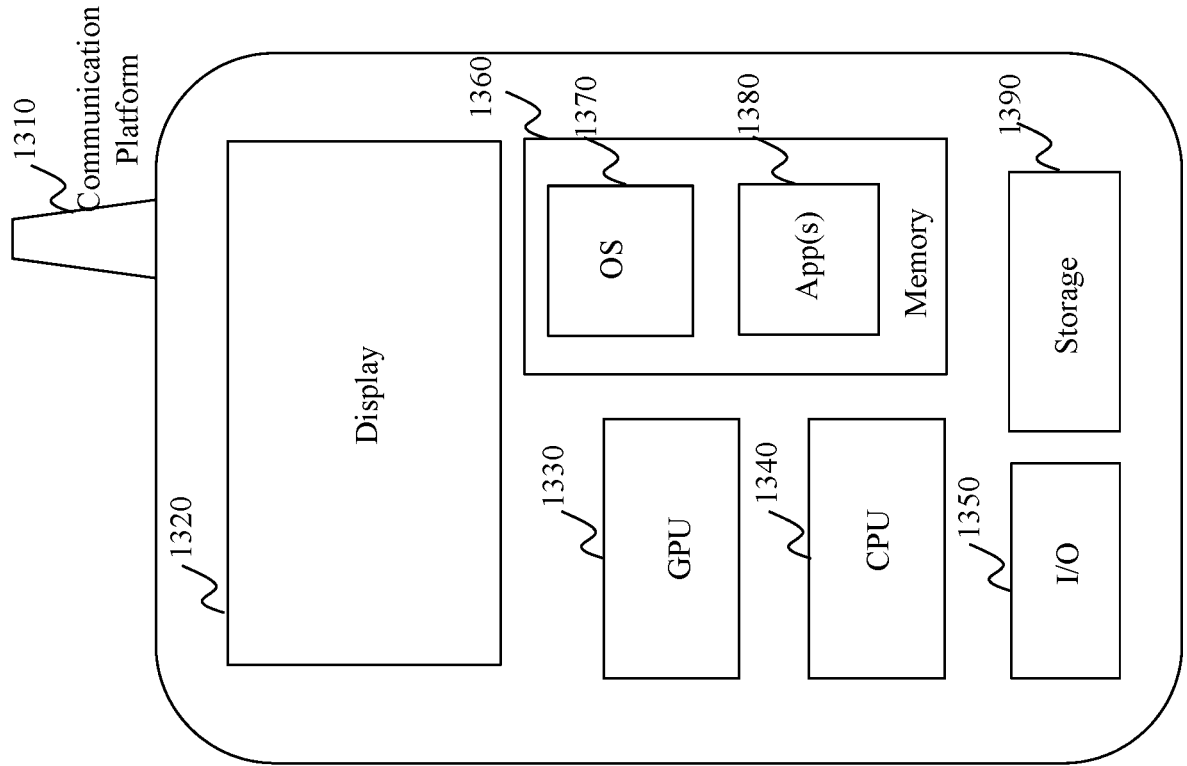
FIG. 13 depicts the architecture of a mobile device which can be used to implement a specialized system incorporating the present teaching.

FIG. 13 depicts the architecture of a mobile device which can be used to realize a specialized system implementing the present teaching. This mobile device 1300 includes, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1300 in this example includes one or more central processing units (CPUs) 1340, one or more graphic processing units (GPUs) 1330, a display 1320, a memory 1360, a communication platform 1310, such as a wireless communication module, storage 1390, and one or more input/output (I/O) devices 1350. Any other suitable component, including but not limited to a system bus or a controller (not shown), may also be included in the mobile device 1300. As shown in FIG. 13, a mobile operating system 1370, e.g., iOS, Android, Windows Phone, etc., and one or more applications 1380 may be loaded into the memory 1360 from the storage 1390 in order to be executed by the CPU 1340.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to the present teachings as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 14:
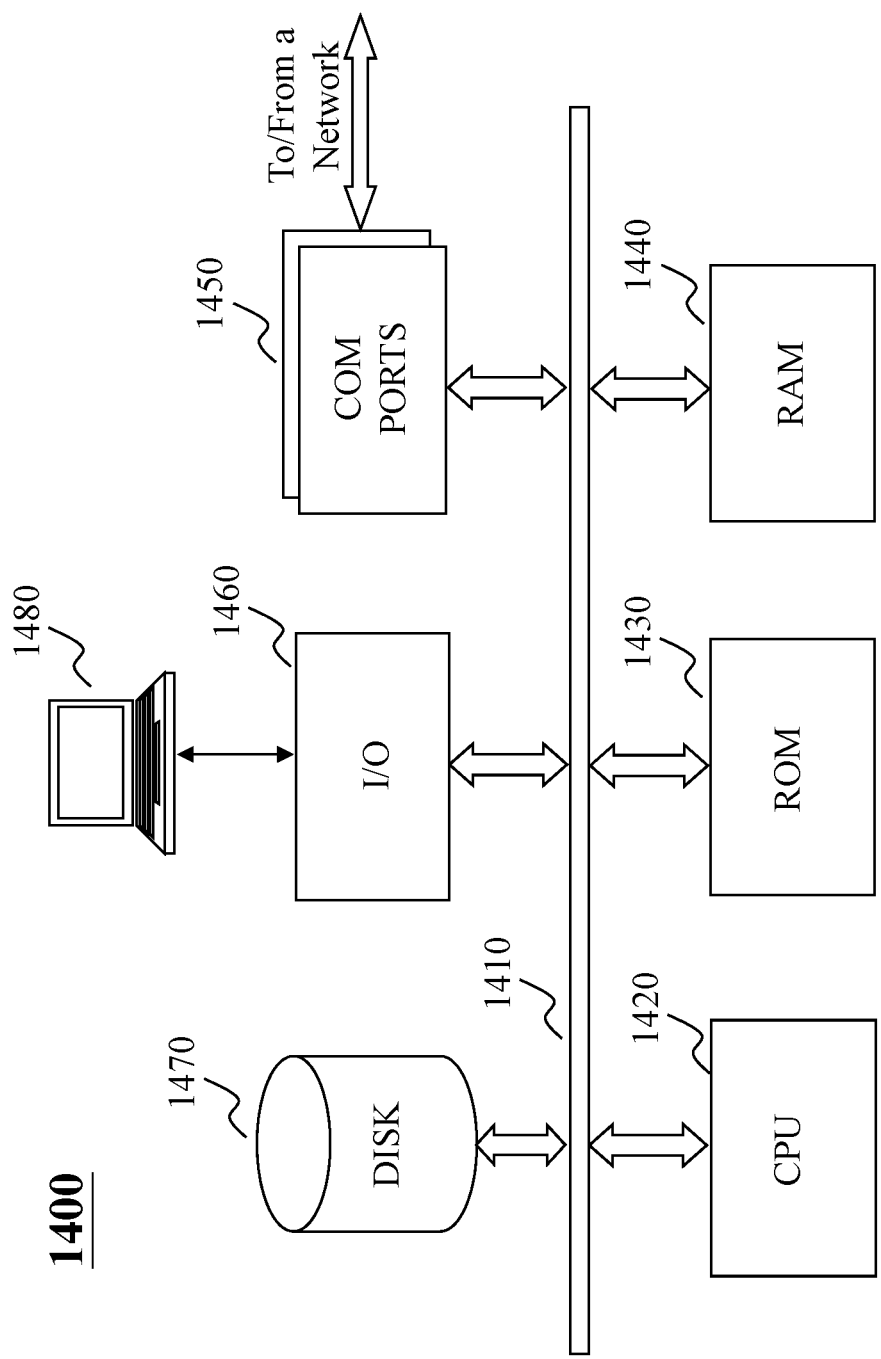
FIG. 14 depicts the architecture of a computer which can be used to implement a specialized system incorporating the present teaching.

FIG. 14 depicts the architecture of a computing device which can be used to realize a specialized system implementing the present teaching. Such a specialized system incorporating the present teaching has a functional block diagram illustration of a hardware platform which includes user interface elements. The computer may be a general-purpose computer or a special purpose computer. Both can be used to implement a specialized system for the present teaching. This computer 1400 may be used to implement any component of the present teachings, as described herein. Although only one such computer is shown, for convenience, the computer functions relating to the present teachings as described herein may be implemented in a distributed fashion on a number of similar platforms, to distribute the processing load.

The computer 1400, for example, includes COM ports 1450 connected to and from a network connected thereto to facilitate data communications. The computer 1400 also includes a central processing unit (CPU) 1420, in the form of one or more processors, for executing program instructions. The exemplary computer platform includes an internal communication bus 1410, program storage and data storage of different forms, e.g., disk 1470, read only memory (ROM) 1430, or random-access memory (RAM) 1440, for various data files to be processed and/or communicated by the computer, as well as possibly program instructions to be executed by the CPU. The computer 1400 also includes an I/O component 1460, supporting input/output flows between the computer and other components therein such as user interface element. The computer 1400 may also receive programming and data via network communications.

Hence, aspects of the methods of the present teachings, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other enhanced ad server into the hardware platform(s) of a computing environment or other system implementing a computing environment or similar functionalities in connection with the present teachings. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the present teachings as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on a computer having at least one processor, a storage, and a communication platform for estimating a pose of an object in autonomous driving, comprising:
   obtaining stereo images of a scene from at least two cameras;
   detecting an object present in the scene based on the stereo images;
   identifying a plurality of feature points of the object;
   determining at least depth information associated with the plurality of feature points;
   obtaining a configuration of the plurality of feature points;
   estimating an orientation of the object based on the configuration of the plurality of feature points and the depth information; and
   determining a pose of the object based on the orientation and additional features of the object.

2. The method of claim 1, wherein when the object corresponds to a vehicle, the plurality of feature points include:
   a left most point of the object as appearing in the stereo images;
   a right most point of the object as appearing in the stereo images; and
   a closest point on the object that has a shortest distance from an ego vehicle having the at least two cameras installed thereon.

3. The method of claim 2, wherein the step of the estimating the orientation comprises:
   in response to the left most, right most, and closest point forming a straight line,
      measuring a distance between the left most and the right most points,
      determining a first orientation as the orientation of the object if the distance satisfies a criterion, and
      determining a second orientation as the orientation of the object if the distance does not satisfy the criterion; and
   in response to the left most, right most, and the closest point not forming a straight line, determining a third orientation as the orientation of the object.

4. The method of claim 3, wherein the criterion is dynamically determined in accordance with the depth information.

5. The method of claim 3, wherein the orientation of the object represents two alternative poses of the object and the pose of the object is to be determined based on the additional features.

6. The method of claim 5, wherein the step of determining the pose comprises:
   determining the additional features to be detected from the object based on the orientation;
   detecting the additional features from at least one of the stereo images; and
   selecting one of the alternative poses of the object as the pose of the object based on the additional features.

7. The method of claim 6, wherein the additional features include at least one of:
   visual features observable from at least one of a frontal view, a rear view, and a side view of the object;
   motion features associated with the object; and
   a combination thereof.

8. The method of claim 6, wherein the step of determining the additional features comprises:
   in response to the orientation corresponding to the first orientation, detecting visual features observable between the left most and right most points representing one of the front or the rear view of the object;
   in response to the orientation corresponding to the second orientation, detecting visual features observable between the left most and right most points representing the side view of the object; and
   in response to the orientation corresponding to the third orientation, detecting visual features observable both between the left most point and the closest point and between the closest point and the right most point, representing at least one of the side view and one of the frontal view and the back view of the object.

9. The method of claim 7, wherein the motion related features include a directionality of movement of the object, wherein the directionality includes one of towards, away, left, and right.

10. A machine readable non-transitory medium having information stored thereon for estimating a pose of an object in autonomous driving, wherein the information, when read by the machine, causes the machine to perform:
    obtaining stereo images of a scene from at least two cameras;
    detecting an object present in the scene based on the stereo images;
    identifying a plurality of feature points of the object;
    determining at least depth information associated with the plurality of feature points;
    obtaining a configuration of the plurality of feature points;
    estimating an orientation of the object based on the configuration of the plurality of feature points and the depth information; and
    determining a pose of the object based on the orientation and additional features of the object.

11. The medium of claim 10, wherein when the object corresponds to a vehicle, the plurality of feature points include:
    a left most point of the object as appearing in the stereo images;
    a right most point of the object as appearing in the stereo images; and
    a closest point on the object that has a shortest distance from an ego vehicle having the at least two cameras installed thereon.

12. The medium of claim 11, wherein the step of the estimating the orientation comprises:
    in response to the left most, right most, and closest point forming a straight line,
       measuring a distance between the left most and the right most points,
       determining a first orientation as the orientation of the object if the distance satisfies a criterion, and
       determining a second orientation as the orientation of the object if the distance does not satisfy the criterion; and in response to the left most, right most, and the closest point not forming a straight line, determining a third orientation as the orientation of the object.

13. The medium of claim 12, wherein the criterion is dynamically determined in accordance with the depth information.

14. The medium of claim 12, wherein the orientation of the object represents two alternative poses of the object and the pose of the object is to be determined based on the additional features.

15. The medium of claim 14, wherein the step of determining the pose comprises:
determining the additional features to be detected from the object based on the orientation;
detecting the additional features from at least one of the stereo images; and
selecting one of the alternative poses of the object as the pose of the object based on the additional features.

16. The medium of claim 15, wherein the additional features include at least one of:
visual features observable from at least one of a frontal view, a rare rear view, and a side view of the object;
motion features associated with the object; and
a combination thereof.

17. The medium of claim 15, wherein the step of determining the additional features comprises:
in response to the orientation corresponding to the first orientation, detecting visual features observable between the left most and right most points representing one of the front or the rear view of the object;
in response to the orientation corresponding to the second orientation, detecting visual features observable between the left most and right most points representing the side view of the object; and
in response to the orientation corresponding to the third orientation, detecting visual features observable both between the left most point and the closest point and between the closest point and the right most point, representing at least one of the side view and one of the frontal view and the back view of the object.

18. The medium of claim 16, wherein the motion related features include a directionality of movement of the object, wherein the directionality includes one of towards, away, left, and right.

19. A system for estimating a pose of an object in autonomous driving, comprising:
a stereo image pre-processor configured for obtaining stereo images of a scene from at least two cameras;
an object detection unit configured for detecting an object present in the scene based on the stereo images;
a critical feature point extractor configured for
identifying a plurality of feature points of the object, and
obtaining a configuration of the plurality of feature points;
an object depth estimator configured for determining at least depth information associated with the plurality of feature points;
an object orientation estimator configured for estimating an orientation of the object based on the configuration of the plurality of feature points and the depth information; and
a pose ambiguity resolution unit configured for determining a pose of the object based on the orientation and additional features of the object.

20. The system of claim 19, wherein when the object corresponds to a vehicle, the plurality of feature points include:
a left most point of the object as appearing in the stereo images;
a right most point of the object as appearing in the stereo images; and
a closest point on the object that has a shortest distance from an ego vehicle having the at least two cameras installed thereon.

21. The system of claim 20, wherein the object orientation estimator is configured to perform:
in response to the left most, right most, and closest point forming a straight line,
measuring a distance between the left most and the right most points,
determining a first orientation as the orientation of the object if the distance satisfies a criterion, and
determining a second orientation as the orientation of the object if the distance does not satisfy the criterion; and
in response to the left most, right most, and the closest point not forming a straight line, determining a third orientation as the orientation of the object.

22. The system of claim 21, wherein the criterion is dynamically determined in accordance with the depth information.

23. The system of claim 21, wherein the orientation of the object represents two alternative poses of the object and the pose of the object is to be determined based on the additional features.

24. The system of claim 23, wherein the step of determining the pose comprises:
determining the additional features to be detected from the object based on the orientation;
detecting the additional features from at least one of the stereo images; and
selecting one of the alternative poses of the object as the pose of the object based on the additional features.

25. The system of claim 24, wherein the additional features include at least one of:
visual features observable from at least one of a frontal view, a rare rear view, and a side view of the object;
motion features associated with the object; and
a combination thereof.

26. The system of claim 24, wherein the step of determining the additional features comprises:
in response to the orientation corresponding to the first orientation, detecting visual features observable between the left most and right most points representing one of the front or the rear view of the object;
in response to the orientation corresponding to the second orientation, detecting visual features observable between the left most and right most points representing the side view of the object; and
in response to the orientation corresponding to the third orientation, detecting visual features observable both between the left most point and the closest point and between the closest point and the right most point, representing at least one of the side view and one of the frontal view and the back view of the object.

27. The system of claim 25, wherein the motion related features include a directionality of movement of the object, wherein the directionality includes one of towards, away, left, and right.

* * * * *